United States Patent [19]

Neff

[11] 3,902,680

[45] Sept. 2, 1975

[54] INFORMATION RECORDING AND PLAYBACK APPARATUS

[75] Inventor: Joseph J. Neff, Pasadena, Calif.

[73] Assignee: Bell & Howell Company, Chicago, Ill.

[22] Filed: Nov. 10, 1972

[21] Appl. No.: 305,413

[52] U.S. Cl. .................. 242/198; 226/91; 242/209; 360/85; 360/96

[51] Int. Cl.[2] .................... G11B 23/10; G11B 15/66

[58] Field of Search ........... 242/199, 200, 198, 210, 242/209, 189, 290; 179/100.2 ZA, 100.2 Z; 274/4 C, 4 E; 360/85, 96; 226/91, 92

[56] References Cited

UNITED STATES PATENTS

| | | | |
|---|---|---|---|
| 3,688,059 | 8/1972 | Miura et al. | 360/85 |
| 3,823,896 | 7/1974 | Finkelstein | 242/199 |

*Primary Examiner*—George F. Mautz
*Attorney, Agent, or Firm*—Benoit Law Corporation

[57] ABSTRACT

An apparatus for performing relative to an elongate information carrier initially located in a casing a predetermined function outside of the casing has a mechanism for moving a length of the elongate information carrier relative to the casing. A drive for the moving mechanism is provided and a device for transmitting driving power to the moving mechanism is connected between the drive and the moving mechanism. A control device is coupled to the transmitting device for controlling the moving mechanism.

An apparatus in accordance with a further aspect of the invention also has a mechanism for moving a length of the elongate information carrier out of the casing. This apparatus further includes a mechanism operatively associated with the moving mechanism for locking the casing of the elongate information carrier in position against manual removal preparatory to movement of the information carrier length out of the casing.

29 Claims, 16 Drawing Figures

INFORMATION RECORDING AND PLAYBACK APPARATUS

CROSS-REFERENCES

The following are assigned to the subject assignee and are herewith incorporated by reference herein:

U.S. Pat. application Ser. No. 89,995, filed Nov. 16, 1970, by Joseph J. Neff, now U.S. Pat. No. 3,730,613, and U.S. patent application Ser. No. 134,172, filed Apr. 15, 1971, by Peter A. Howes and Eugene A. Cooper now U.S. Pat. No. 3,734,426.

BACKGROUND OF THE INVENTION

1. Field of the Invention

The suject invention relates to information recording and playback onto and from elongate information carriers and, more specifically, relates to apparatus having the elongate information carrier initially located in a casing and performing recording, playback or another predetermined function outside of the casing.

2. Description of the Prior Art

The use of magnetic tape cassette has become widespread in recent years. While these cassettes have been satisfactory in many applications, their use tends to limit the size of the tape advance capstan and of the recording and playback head, the versatility of the functions performable relative to the recording tape, and also the rapid start-stop capabilities of the recording and playback equipment.

It has thus been proposed to move a length of the recording tape out of the cassette and to perform recording, playback or another desired function outside of the cassette. this tends to engender malfunction, primarily from a premature removal of the cassette from the recorder, from a lack of control over the tape loop extraction process and from insufficient or excessive tensioning of the tape during formation of the external tape loop.

Similar problems exist in the photographic film cartridge area and in other fields in which an information carrier (tape, film, etc.) is removed from a cassette, cartridge or other casing for the performance of a function outside of the casing.

SUMMARY OF THE INVENTION

It is an object of this invention to overcome the above mentioned disadvantages.

It is a related object of this invention to provide improved apparatus for performing relative to an elongate information carrier initially located in a casing a predetermined function outside of the casing.

It is a related object of this invention to provide, in apparatus of the latter type, improved means for controlling movement of a length of the elongate information carrier relative to the casing.

It is a related object of this invention to provide, in an apparatus of the latter type, improved means for controlling the return of a length of information carrier to the casing.

It is a related object of this invention to provide, in apparatus of the type herein set forth, improved means for controlling movement of the information carrier casing to prevent malfunction of the apparatus and damage to the information carrier.

A further object of this invention is also directed to an apparatus for performing, relative to an elongate information carrier initially located in a casing, a predetermined function outside of the casing, and resides in the provision of improved means for locking the casing in position against manual removal preparatory to movement of an information carrier length out of the casing.

It is a further object of this invention to control tension of the information carrier during removal thereof from the information carrier casing.

Additional object will become apparent in the further course of this disclosure.

From one aspect thereof, the invention resides in an apparatus for performing relative to an elongate information carrier initially located in a casing a predetermined function outside of the casing. The invention according to this aspect resides, more specifically, in the improvement comprising, in combination, means for moving a length of the elongate information carrier relative to the casing and for forming said length of information carrier into a loop outside said casing for the performance of said function, means for driving the moving means from an initial position to an advanced position for the formation of said loop, and from said advanced position back to said initial position, means connected between the driving means and the moving means for transmitting driving power to the moving means, means coupled to the transmitting means independently of said driving means for controlling the moving means said controlling means including means for determining completion of a predetermined operation including completed formation of said loop by said moving means, and means for stopping and retaining said moving means in said advanced position upon determination of said completion, and means for performing said predetermined function relative to said information carrier outside of said casing.

From another aspect thereof, this invention resides in an apparatus for performing relative to an elongate information carrier initially located in a casing a predetermined function outside of the casing. The invention according to this aspect resides, more specifically, in the improvement comprising, in combination, container means for said casing, means coupled to said container means for moving said container means to a first position for selective insertion of said casing into and removal of said casing from said container means, means for moving a length of the elongate information carrier out of the casing and for returning a length of said elongate information carrier into said casing, means operatively associated with the moving means for locking the container means in a second position against manual removal preparatory to movement of the information carrier length out of the casing and until completion of said return an information carrier length into said casing, and means coupled to said moving means and said locking means for releasing said locking means upon a return of said information carrier into said casing.

From yet another aspect thereof, this invention resides in an apparatus for performing relative to an elongate information carrier initially located in a casing a predetermined function outside of the casing. The invention according to this aspect resides, more specifically, in the improvement comprising, in combination, means for moving a length of the information carrier out of the casing, means for driving the moving means, means connected between the driving means and the moving means for transmitting driving power to the moving means, and means coupled to the transmitting means for locking the casing in position upon transmission of driving power to the moving means.

BRIEF DESCRIPTION OF THE DRAWINGS

The subject invention and its various aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figures 1, 4, 9:
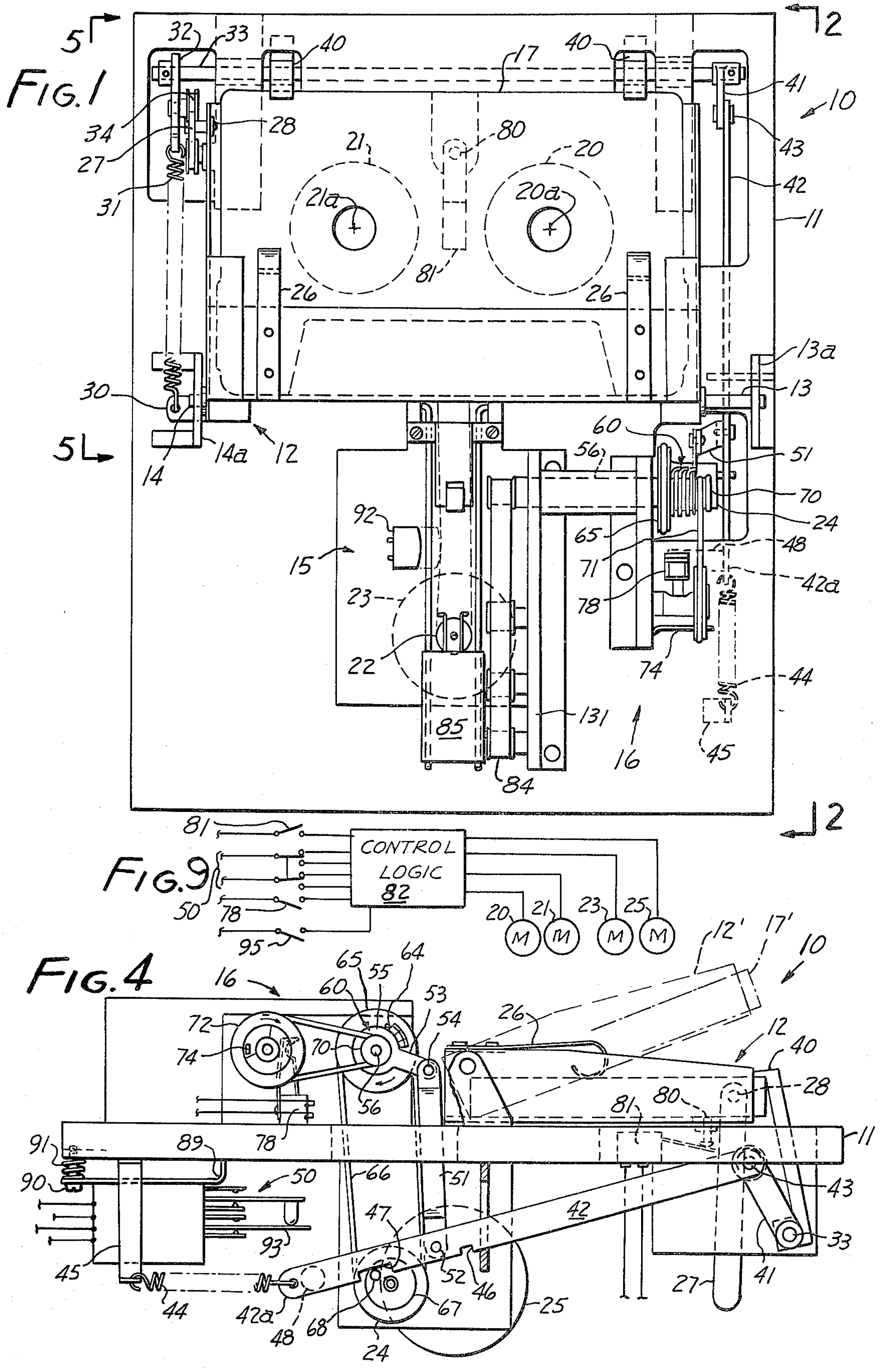
FIG. 1 is a top view of a tape cassette recording and playback apparatus in accordance with a first preferred embodiment of the subject invention.
FIG. 4 is a side view similar to FIGS. 2 and 3, showing yet another state of operation of the apparatus shown in FIG. 1.
FIG. 9 is a block diagram of electrical equipment which may be employed in the apparatus shown in FIG. 1.

The cassette recorder 10 comprises a main frame 11 which supports a cassette container 12 pivoted at 13 and 14 in brackets 13*a* and 14*a*, respectively, a tape pull out or loading device 15, and a control mechanism 16. A cassette 17 may be located in the container 12.

Shown in dotted lines in FIG. 1 are two reel motors 20 and 21 which control torque on the tape reels (not shown) in the cassette. The motors 20 and 21 drive splines 20*a* and 21*a*, respectively. There is also a capstan 22 driven by capstan motor 23 shown in dotted outline. A reversible motor 25 is provided to drive a pulley 24 through a conventional gear (not shown).

Figure 2:
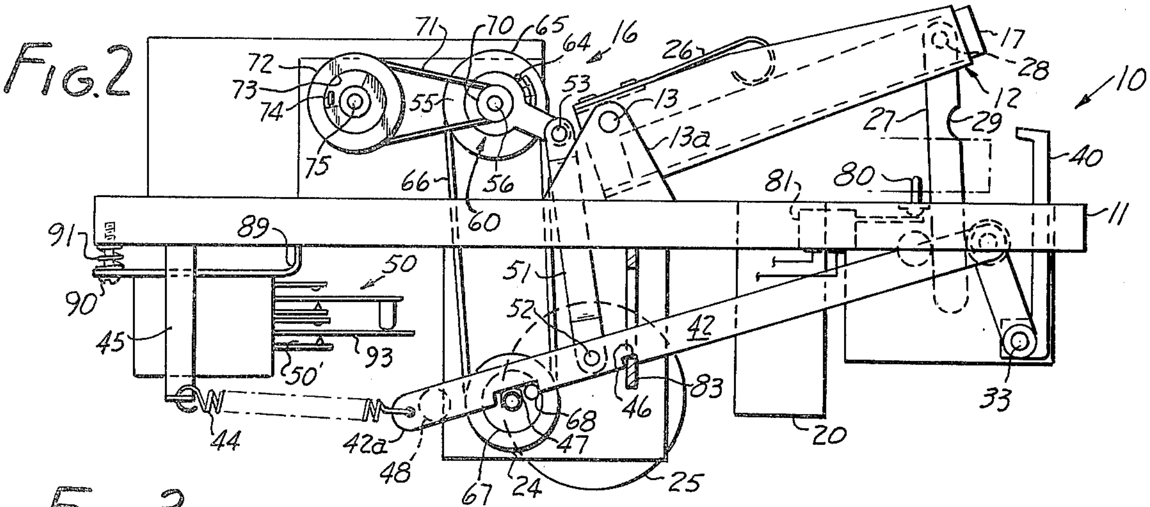
FIG. 2 is a side view on the line 2—2 of the apparatus shown in FIG. 1.

Referring to FIGS. 1 and 2, a standard cassette 17 is shown inserted in the container 12 and retained therein by spring clips 26. A holding bar 27, hingedly attached to the container 12 at a hinge pin 28, has a retaining notch 29. A bracket 30 protrudes from the lower edge of container 12 (see FIGS. 1 and 5) and has a spring 31 attached thereto. The other end of the spring 31 is hooked to the top of an arm 32. The lower end of the arm 32 is rigidly attached to the rotatable with a shaft 33.

A first grooved wheel 34 is rotatably mounted on the arm 32 near its middle and engages the notch 29 in the bar 27. A second grooved wheel 35 is rotatably mounted on the frame 11. The bar 27 rides in grooved 34*a* and 35*a* of the wheels 34 and 35, respectively.

Lock arms or levers 40 and a bell crank 41 are rigidly secured to the shaft 33. One end of a floating first lever 42 is hinged to the crank 41 by a pin 43, the other end 42*a* being fastened to a spring 44. Spring 44 is attached to a bracket 45 on the frame 11. The first lever 42 contains two notches 46 and 47 and a trip bar 48 which protrudes inwardly to actuate a double-pole double-throw switch 50 (see FIGS. 2 and 3). The switch 50 is supported on the frame 11 by a flexible bar 89. The switch blades 93 are adjustable relative to the trip bar 48 by means of a screw 90 and spring 91.

A floating second lever 51 has one end hinged to first lever 42 by a pin 52 and has its other end hinged to a crank lever 53 by a pin 54. The hub 55 of the crank lever 53 floats freely on a carriage drive shaft 56. The shaft 56 actuates the tape pull-out device 15.

Figure 6:
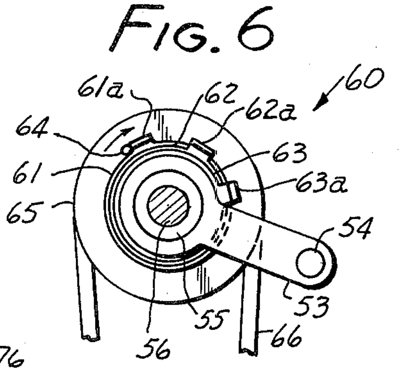
FIG. 6 is a side view, on an enlarge scale, of a mechanism in accordance with a preferred embodiment of the subject invention, forming part of the apparatus shown in FIG. 1.

As best seen in FIG. 6, the recorder control mechanism comprises a revolution counting device 60 having three floating discs 61, 62, and 63 with tabs 61*a*, 62*a* and 63*a*, respectively. The discs 61, 62 and 63 are free to rotate on the shaft 56 until a pin 64 on a pulley 65 engages the tab 61*a* or 63*a*. Thereupon each tab picks up the next tab on successive rotations until the tab 63*a* or 61*a* engages and applies force to the crank arm 53 and causes it to rotate.

The motor-driven pulley 24 drives the pulley 65 by way of a spring belt 66. Integral with the pulley 24 is a hub 67 from which a pin 68 protrudes into alignment with the notch 47 in floating lever 42.

Figure 7:
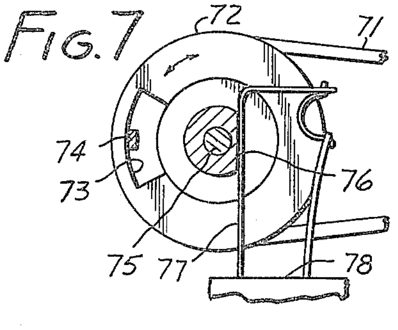
FIGS. 7 and 8 are side views, on an enlarged scale, of a tape tension control device in accordance with a preferred embodiment of the subject invention, forming part of the apparatus shown in FIG. 1.

A pulley 70 is secured to the shaft 56 and drives another pulley 71 by way of a spring belt 71. Pulley 72 has an open slot 73 into which a stop arm 74 protrudes from the frame 11, restricting the revolution of the pulley 72 on a shaft 75 in either direction to approximately 90°. a flat portion 76 on the hub of pulley 72 (see FIGS. 7 and 8) contacts a flexible arm 77 which actuates an over center reversing toggle switch 78.

A switch button 80 is mounted on the frame 11 under the cassette container 12 to actuate a primary switch 81 in response to engagement by and downard movement of any cassette 17.

to initiate operation of the cassette recorder 10, a tape cassette 17 is placed in the container 12. The parts of the recorder are then in a neutral position as shown in FIG. 2. The cassette with container 12 is then pushed downwardly to the position shown in FIG. 3. The cassette reels engage the two reel driving splines 20*a* and 21*a*. The cassette housing contacts the switch button 80, thereby actuating the switch 81 that controls the starting sequence of the control logic 82. If the container 12 is pushed down without a cassette being inserted, the switch 81 and the control logic 82 are not actuated. The container 12 then merely pops back up and accidental starting of the logic is avoided.

Figure 3:
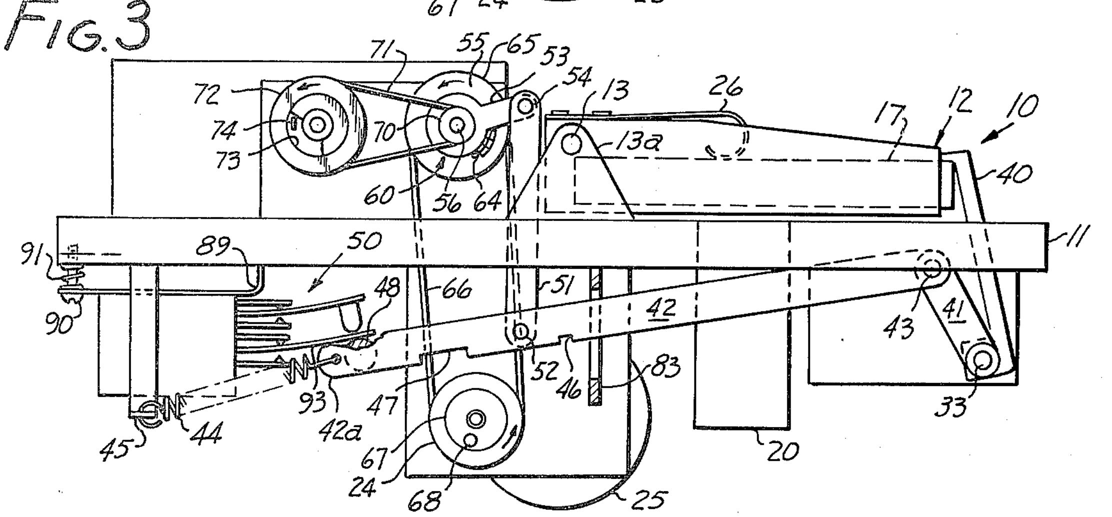
FIG. 3 is a side view similar to FIG. 2 showing a further state of operation of the apparatus shown in FIG. 1.
Figure 5:
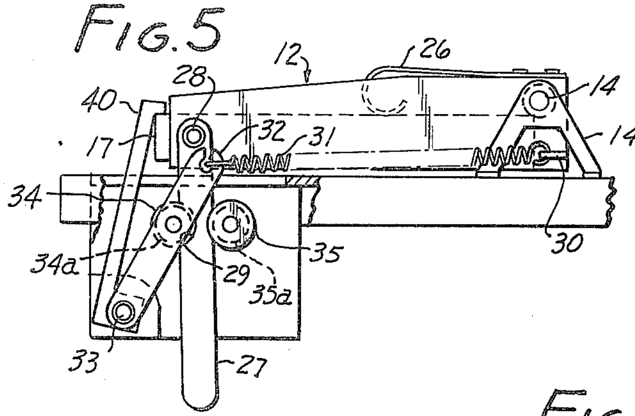
FIG. 5 is a partial side view, taken on the line 5—5 of the apparatus shown in FIG. 1.

A signal from the control logic 82 starts the reel motor 20 which tightens the tape. A fraction of a second later, the loading motor 25 is started. This rotates the pulley 24 counter-clockwise as seen in FIG. 3 and the pin 68 forces the first lever 42 upwardly, thereby disengaging notch 46 from of stop latch 83. Spring 44 then pulls the lever 42 which rotates the shaft 33 and lock arms 40 counter-clockwise as seen in FIG. 3 to lock the casette in place. The rotating shaft 33 also permits the spring-biased arm 32 to rotate clockwise as seen in FIG. 5. This permits the wheel 34 on the arm 32 to engage the notch 29 in the bar 27 to retain the container 12 in position.

Figure 8:
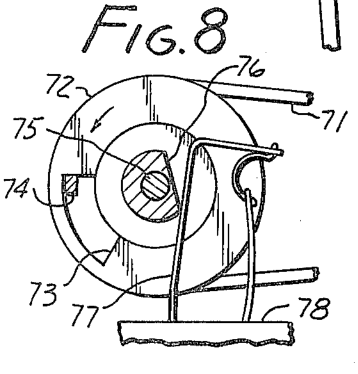

Simultaneously, the motor 25 drives the shaft 56 through pulleys 24 and 65 and spring belt 66. This accomplishes three operations: first, it rotates the pulley 72 counter-clockwise as seen in FIGS. 3 and 8, causing switch 78 to signal the control logic 82 for less tape tensioning through the reel motors 20 and 21; secondly, it actuates the revolution counder 60 (see FIGS. 3 and 6) which, after several revolutions, as predetermined by the discs 61 to 63 and taps 61*a* to 63*a*, urges the crank 53 counter-clockwise as seen in FIG. 3 and thereby the levers 42 and 51 upwardly so the bar 48 actuates switch 50; and thirdly, it rotates the shaft 56 and advances the carriage drive belt 84 to drive the carriage 85 which pulls the tape out of the cassette and places the resulting tape loop over the capstan 22.

During the "loading cylce", that is when the tape is being pulled out of the cassette and placed over the capstan, the tension on the tape has to be decreased to prevent undue stress on the tape. To this end, the switch 78 signals the control logic 82 to reduce the energization of the reel motors 20 and 21 during tape loading. Of course, some energization of the reel motors is permitted to persist, so that the tape will be pulled against the pull-out mechanism for improved loading, and so that the tape will be pulled back into the cassette when it should be lost by the tape pull-out mechanism.

After the loading cycle, the control logic 82 stops the motor 25 in response to actuation of the switch 50, restores normal tape tension and activates a ready state for the capstan motor 23 for manual or electronically controlled initiation of a tape recording or playback operation.

At the end of a recording or playback operation performed by a head 92, a switch 95 (sec FIG. 9) ay be actuated in any conventional manner to cause the control logic to energize the motor 25 for rotation in a sense opposite to its sense of rotation during the loading cycle. This rotates the pulley 24 clockwise as seen in FIG. 4. The rotating pulley 24 rotates the pulley 65 also clockwise by way of the spring belt 66. Rotating from the position shown in FIG. 3 to the position shown in FIG. 4, the pin 64 on the pulley 65 engages the tab 61*a* (see FIG. 6). At the same time, the pulley 65 rotates the shaft 56 for an actuation of the tape carriage toward the cassette 17 and a return of the tape to the cassette. After a sufficient number of revolutions for this purpose, the pin 64, acting through the tabs 61*a* and 63*a*, pushes the levers 53, 51 and 42 downwardly to the position shown in FIG. 4. The pin 68 on the rotating pulley 24 now catches the lever 42 at the notch 47 and pushes the levers 42 and 41 and the lock arms 40 to the right as seen in FIG. 4. This releases the cassette 17 from the lock arms 40 and the cassette container arm 27 from the wheels 34 and 35, whereupon the cassette with container 12 pops up by action of the spring 31 (see FIGS. 1 and 5) to the position shown in FIG. 4 in dotted outline at 12' and 17'.

In its travel impelled by the pin 68 on the rotating pulley 24, the lever 42 catches the stop 83 at its notch 46, whereby the lever 42 with associated parts is reset to the initial position shown in FIG. 2.

In the course of these events, the switch 50 is deactivated for a resetting of the control logic preparatory to the next recording or playback operation.

In accordance with a preferred embodiment of the subject invention, the transmission represented by the spring belts 66 and 71 (composed, for instance, of endless helical springs) are resilient so as to permit some over travel of the pulley 24 relative to the pulley 65 and shaft 56, and so as to permit over travel of the pulley 65 and shaft 56 relative to the pulley 72, with the belts 66 and 71 acting in the nature of slip clutches. Excessive rotation of the shaft 56 and excessive travel of the tape carriage 85 are effectively prevented by the counter 60, with tabs 61*a* to 63*a*, which arrests further rotation of the shaft 56 in either direction when the intended travel of the tape carriage has been completed.

In a prototype of a preferred embodiment of the subject invention, the counter 60 limited rotation of the shaft 56 to three and one-half revolutions in either direction, which was sufficient to cause either extraction of the tape from the cassette and placement of the resulting tape loop over the tape drive capstan, or return of extracted tape to the cassette.

An improved tape pull out or loading device 15 in accordance with a preferred embodiment of the subject invention will now be described with the aid of FIGS. 10 to 15. This loading device 15 comprises features disclosed in my above mentioned U.S. Pat. application Ser. No. 89,995.

Figure 15:
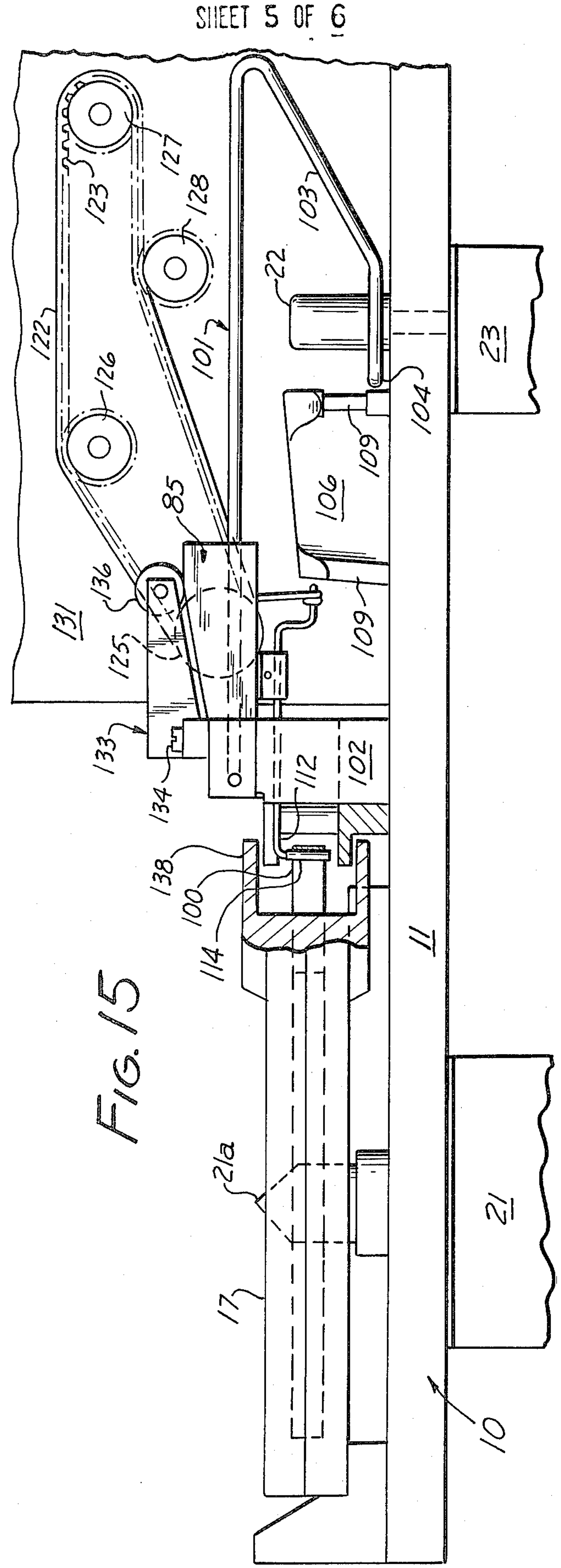
FIG. 15 is a side view of the mechanism shown in FIG. 10.

The tape loading device 15 includes the above mentioned movable carriage 85 for extracting a length of magnetic recording tape 100 from the tape cassette 17 preparatory to the performance of a function on the recording tape at a location outside of and spaced from the cassette 17, and for returning a length of recording tape to the cassette 17 after the performance of a function at such spaced location. The carriage 85 rides on a track 101 which is pivotally mounted at one end to a block 102 attached to and rising from the main frame 11 of the cassette recorder 10. As best seen in FIG. 15, the other end of the track 102 is bent over at 103 so that the bight portion 104 of the U-shaped track straddles or extends partially around the tape advance capstan 22 when the pivotally mounted track 101 is in its illustrated lower position. It has been found in practice that the bent track portion 103 and particularly the bight portion 104 aids in preventing the recording tape 100 from falling off the extracting fingers during loading or unloading of the tape onto and from the capstan 22.

A further device for preventing disengagement of the tape from the tape extraction fingers in accordance with a preferred embodiment of the subject invention takes the form of a rib 106 attached to and rising from the main frame 11 below the track 101 and between the cassette 17 or block 102 and the capstan 22.

Figure 12:
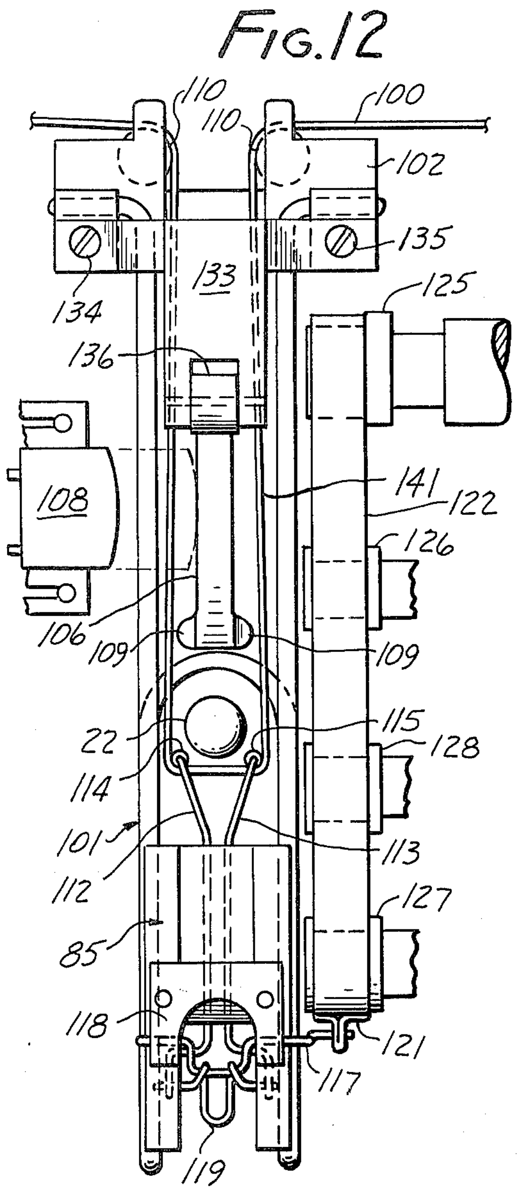

As seen in FIG. 12, the rib 106 is preferrably located adjacent a magnetic recording or recording and playback head 108 of the recorder 10. The rib 106 preferably has spaced lateral projections 109 for guiding and tightening the tape relative to the magnetic head 108. Tape guiding rollers 110 or corresponding rounded portions may also be provided at the block 102.

The carriage 85 carries a pair of fingers 112 and 113 which have finger portions 114 and 115, respectively.

These finger portions are formed of end portions of the wires which provide the fingers 112 and 113 and of sleeves of a conventional wear-resistant flexible material.

Figure 10:
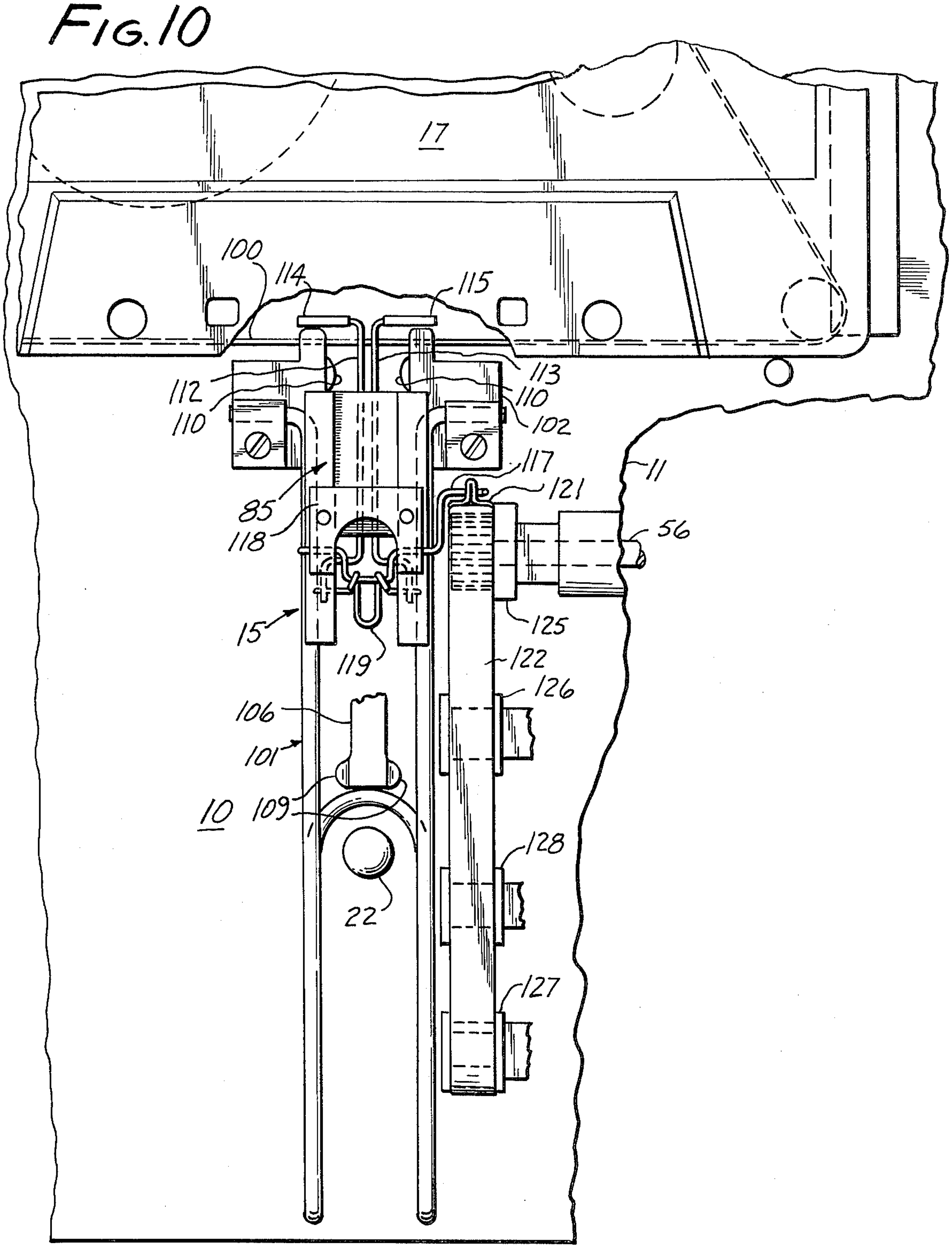
FIG. 10 is a plan view of a tape loop extraction and return mechanism that may be employed in the apparatus shown in FIG. 1.
Figure 11:
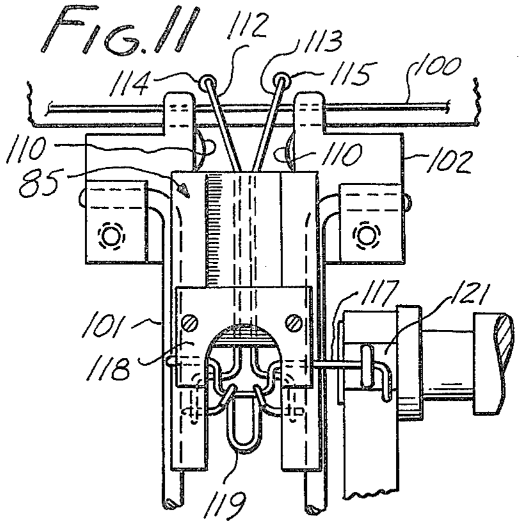
FIGS. 11 to 14 are detail views showing different states of operation of the mechanism shown in FIG. 10.

A bent piece of wire forms a finger actuator 117 which is pivotally mounted on the carriage 85 with the aid of a metal plate 118. The finger actuator 117 is connected by a wire spring 119 to the fingers 112 and 113. This wire spring 119 imparts a bistable character to the actuation of the fingers 112 and 113. Accordingly, the finger portions 114 and 115 have a first position in which they extend substantially parallel to an edge of the recording tape 100 as shown in FIG. 10, and a second position in which they extend substantially at right angles to a recording tape edge, as shown in FIGS. 11 to 15.

A bracket 121 connects the finger actuator 117 to an endless flexible belt 122. The endless belt 122 has teeth 123 at the inside thereof (see FIG. 15) which mesh with gear pulleys 125, 126, 127 and 128. The pulley 125 is mounted on, and rotated by, the previously mentioned carriage drive shaft 56. As seen in FIGS. 1 and 15, the pulleys 126, 127, and 128 are rotatably mounted on an upright bracket or wall section 131.

The mounting of the pulley 126 relative to the pulley 125 imparts to the belt 122 a relatively steep incline in the vicinity of the cassette 17, assuring a rapid elevation of the pulled-out tape portion at an inclined angle relative to a horizontal plane through the cassette 17 and top of the capstan 22. In this manner, the pulled-out length of tape 100 and the finger portions 114 and 115 will clear the upright rib 106 and also any magnetic recording or other head located adjacent thereto.

A hold-down device 133, shown in FIGS. 12 and 15, is mounted on the block 102 by screws 134 and 135 and has a roller 136 rotatably mounted on its free end. The roller 136 bears against the carriage 85, assuring that the finger portions 114 and 115 are in a precise position for an insertion thereof between the upper edge of the tape 100 and an adjacent casing portion 138 of the cassette 17, as well as a correct positioning thereof at the outset of the tape extraction operation and at the end of a tape return operation.

As mentioned above, the motor 25 shown in FIGS. 2 to 4 drives the shaft 56 through pulleys 24 and 65 and spring belt 66. Initially, this advances the belt 122 in a clockwise direction as seen in FIG. 15, whereby the bracket 121 is lifted upwardly from the initial position shown in FIG. 10 to the position shown in FIG. 11. This actuates the finger actuator 117 correspondingly upwardly and, by action of the wire spring 119, moves the finger portions 114 and 115 from the horizontal position shown in FIG. 10 to the vertical position behind the recording tape 100 shown in FIG. 11.

Through continued rotation of the shaft 56 and advance of the belt 122, the bracket 121, acting through the finger actuator 117, pulls the carriage 85 to the right as seen in FIG. 15, whereby the finger portions 114 and 115 pull a length of recording tape 100 out of a window in the cassette 17.

Figure 13:
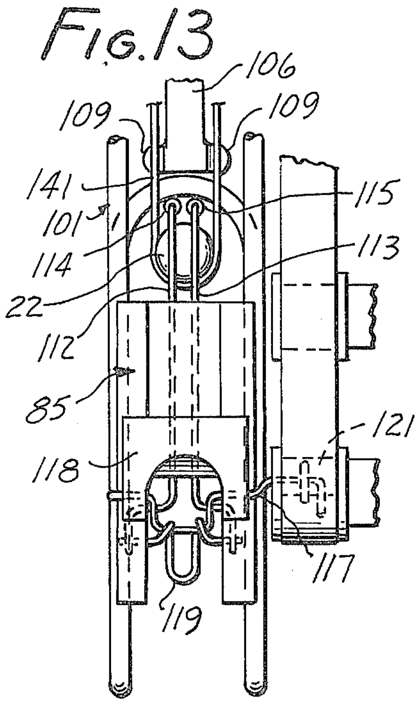
Figure 14:
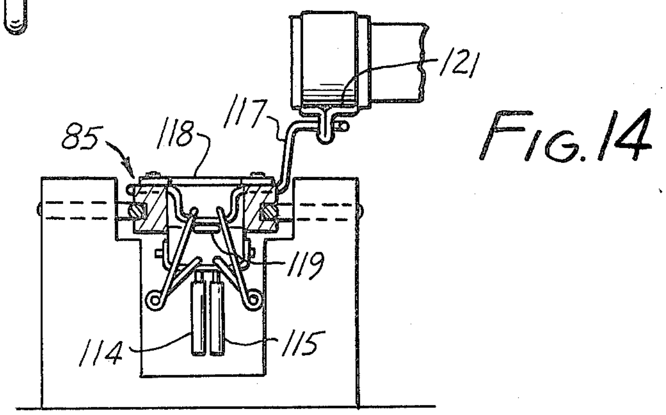

In the further course of this operation, the generally U-shaped tape loop 141 shown in FIG. 12 is formed. At that stage, the bracket 121 has been advanced to the position shown in FIG. 12 adjacent the pulley 127. Continued rotation of the shaft 56 and continued advancement of the belt 122 moves the bracket 121 to a position below the pulley 127, as shown in FIGS. 13 and 14. This moves the finger portions 114 and 115 past the capstan 22 whereby the bight portion of the tape loop 141 is placed about the capstan 22 as shown FIG. 13. After completion of such placement, rotation of the shaft 56 and advancement of the belt 122 and briefly continued until the finger portions 114 and 115 have been moved out of engagement with the capstan 22 and tape loop 141 as shown in FIG. 13.

At that instant, the revolution counter 60 (see FIGS. 1 to 3 and 6) mechanically arrests further rotation of the shaft 56 and actuates the switch 50 which, as mentioned above, stops the motor 25, restores normal tape tension and activates a ready state for the capstan motor 23 for manual or electronically controlled initiation of a tape recording or playback operation.

The head 92 shown in FIG. 1 or the head 108 shown in FIG. 12 may then be placed in contact with the tape 100 at the loop 141 for a recording or playback operation. The equipment according to the subject invention also permits a fixed location of the recording or playback head adjacent the rib 106 and an insertion of the recording tape between such rib and recording or playback head.

As mentioned above, the pulley 24 is rotated clockwise as seen in FIG. 4 for a return of the tape loop to the cassette 17. In this manner, the shaft 56 is rotated clockwise as seen in FIG. 4 and the belt 122 is advanced counter-clockwise as seen in FIG. 15. This results in movement of the finger portions 114 and 115 past the capstan 22, whereby the bight portion of the tape loop 141 is lifted off the capstan 22 as seen in FIG. 12. Continued advancement of the belt 122 in a counter-clockwise direction as seen in FIG. 15 moves the carriage 85 from the position shown in FIG. 12 back to the position shown in FIG. 11, whereby the recording tape is returned to the cassette. Due to the bistable nature of the finger actuating mechanism (see spring 119) the finger portions 114 and 115 in a vertical position during their travel back to the cassette, even though the carriage is pulled by way of the finger actuator 117 during this operation. However, the finger portions 114 and 115 will be moved from their vertical position shown in FIG. 11 to their horizontal position shown in FIG. 10 as the bracket 121 is moved from the position illustrate in FIG. 11 to the position depicted in FIG. 10. at that juncture the counter 60 mechanically arrests further rotation of the shaft 56 in the above mentioned manner and causes a release of the cassette 17 to the position shown in FIG. 1 in dotted outline at 17'. The cassette 17 may then be removed from the recorder and another cassette may be inserted in the container 12.

The control logic 82 shown in FIG. 9 may be of a type composed of conventional components and circuits and designed by an electronic engineer or circuit designer of ordinary skill.

Figure 16:
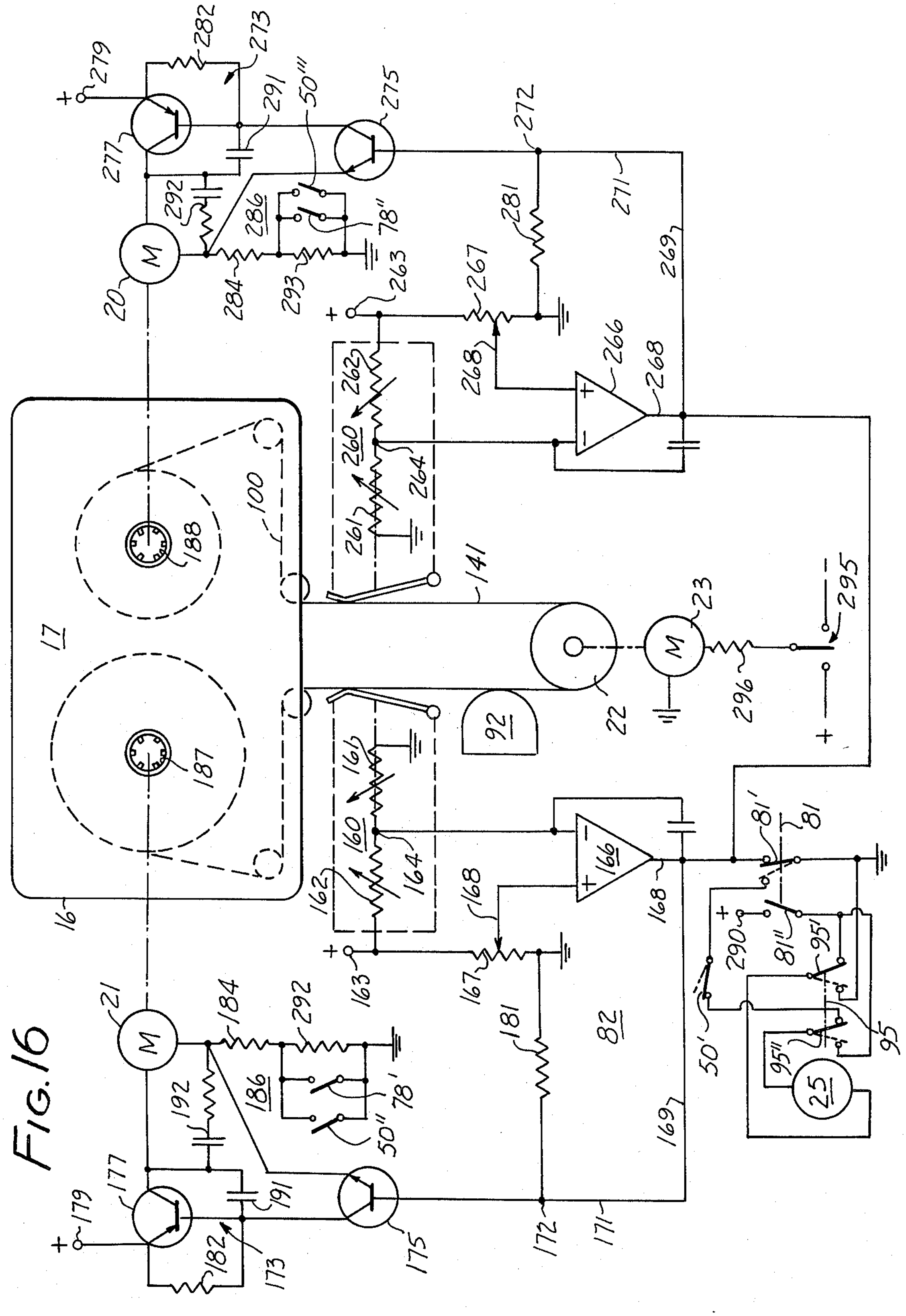
FIG. 16 is a circuit diagram of elecrical equipment that may be employed in the apparatus shown in FIG. 1.

On the other hand and by way of example, FIG. 16 discloses a control logic 82 which may be employed in the subject recorder 10 and which includes some inventive features of the type disclosed in the above mentioned U.S. patent application Ser. No. 134,172, by Howes and Cooper.

The control logic 82 has a tension sensor 160 including strain gages 161 and 162 energized from a power input terminal 163 and having an output 164 connected to the inverting input of an operational amplifier 166. A potentiometer 167 has a wiper arm 168 connected to the non-inverting input of the amplifier 166 in order to provide a potential indicative of a desired tension of the recording tape 100 in the tape loop 141.

The signal provided by the amplifier 166 at its output 168 is applied by way of leads 169 and 171 to the input 172 of a power amplifier 173 which energized the reel motor 21 which drives the spline 21*a* (see FIG. 1).

The power amplifier 173 has a transistor 175 having a base connected to the amplifier input terminal 172. The power amplifier 173 further has a transistor 177 having a base connected to the collector of the transistor 175 and having an emitter connected to a power input terminal 179. A bias resistor 181 for the base of the transistor 175 is connected between the amplifier input terminal 172 and ground, and a bias resistor 182 for the transistor 177 is connected between the base and the emitter of the transistor 177. The reel motor 21 may be of a conventional permanent-magnet type and a connected between the collector of the transistor 177 and a resistor 184. The resistor is grounded by a normally closed contact 78′ of the above mentioned switch 78 (see FIGS. 7 and 8). The switch 78 also has a normally closed contact 78″ associated with the other reel motor 20 as shown near the upper right-hand corner of FIG. 16.

The emitter of the transistor 175 is connected to the top of the resistor 184 as seen from ground potential, so as to receive a bias corresponding to the current flowing through the motor 21. In this manner, a feedback loop or path 186 is provided for the power amplifier 173.

The reel motors tension the tape 100 in the tape loop 141 when they rotate or attempt to rotate the tape hubs 187 and 188. The resulting tension is picked up by the sensor 160 which accordingly actuates the strain gages 161 and 162, providing a negative feedback signal for the operational amplifier 166 which controls the power amplifier 173 and thus the reel motor 21 in a closed-loop servo system. To stabilize the operation of the servo system, a capacitor 191 is connected between the base and collector of the transistor 177. Similarly, an RC network 192 is connected across the motor 21.

To provide servo loops on either side of the capstan 22 and to inhibit effectively slippage of the recording tape on the capstan surface, a duplicate tension sensing and servo system is provided in the control logic 82. Indentical components and connections in this duplicate system are designated in FIG. 16 by reference numerals which are augmented by hundred relative to the reference numerals of the previously described servo system of the control logic 82.

The above mentioned switch 81 has a pair of contacts 81′ and 81″ shown at the bottom of FIG. 16. The contact 81′ has a solidly illustrated initial position in which the inputs 172 and 272 of the reel motor amplifiers 173 and 273 are grounded so that the reel motors 20 and 21 stand still.

Upon insertion and depression of a cassette 17 as described above in connection with FIG. 2, the switch buttom 80 is depressed, moving the contact 81′ to its second position illustrated in dotted outline in FIG. 16 and closing the normally open contact 81″ of the switch 81. In this manner, an energizing circuit for the motor 25 is established from a power input terminal 290 by way of the contact 81″, a contact 95′ of the above mentioned switch 45 (see FIG. 9), the motor 25, a contact 95″ of the switch 95, a normally closed contact 50′ of the above mentioned switch 50 (see FIG. 2), the contact 81′ in its second position, and ground. The motor 25 thereupon rotates the pulley 14 in a counter-clockwise direction as seen in FIG. 2 until the tape loop 141 has been extracted and placed about the capstan 22 as described above.

Preparatory to such extraction, the rotating motor 25 actuates the switch 78 by way of the transmissions 66 and 71, as described above. This opens the normally closed contacts 78′ and 78″ of the switch 78. As shown in FIG. 16, this places resistors 292 and 293 in series with the resistors 184 and 284, respectively, thereby reducing the energization of the reel motors 20 aand 21 and, accordingly, reducing the tension imposed on the recording tape 100 for the duration of the tape extraction process.

After the tape loop has been placed about the capstan 22, the switch 50 is actuated by the lever 42 as described in connection with FIG. 3. This opens the switch contact 50′ so that the motor 25 is stopped. At the same time, two normally open contacts 50″ and 50‴ of the switch 50 are closed. As shown in FIG. 16, these contacts are in parallel to the resistors 292 and 293, thereby assuring that the desired higher tape tension lever is established preparatory to a recording or playback process.

The capstan motor 23, which may be of a permanent-magnet field type, may then be energized for rotation of the capstan 22 in either direction by manipulation or appropriate control of a switch 295 shown in FIG. 16. A variable resistor 296 may be adjusted to control the energization of the capstan motor 23. A recording or playback head 92 may then be employed to record information on the tape 100 or reproduce recorded information therefrom. By operation of the servo systems shown in FIG. 16, the tape will be advanced and wound in either direction as recording or playback operations are in progress.

In order to return the tape to the cassette, the switch 95 is actuated so that the contacts 95′ and 95″ are moved to their second positions, illustrated in dotted outline in FIG. 16. An energizing circuit for the motor 25 is then established from the power input terminal 290 by way of the closed contact 81″, the switch 95″, the switch 95′, and ground. In this manner, the motor 25 which, as mentioned, may be of a permanent-magnet field type, is energized for rotation in the opposite direction, so that the pulley 24 is rotated clockwise as seen in FIG. 4.

As mentioned above, this causes the carriage 85 and finger portions 114 and 115 to remove the tape loop from the capstan 22 and to return such loop to the cassette 17. If desired, a reduction in tape tension can also be realized during this tape return, such as by providing in series with the contacts 50″ and 50‴ to normally closed contacts (not shown) which belong to the switch 95 and which are opened when the contacts 95′ and 95″ are moved to their second positions illustrated in dotted outline. As will be readily apparent from FIGS. 4, 7 and 8, the switch 78 will also be actuated to close the contact 78′ and 78″ (see FIG. 16) when the tape is returned to the cassette, so that the desired tape tension reduction may then be realized.

The switch button 80 is released when the cassette 17 pops to its released position 17′ shown in FIG. 4. This opens the contact 81″ for a deenergization of the motor 25, and actuates the contact 81' to its initial position for a deenergization of the reel motors 20 and 21. The cassette 17 may then be removed and replaced by another cassette.

Variations and modifications within the spirit and scope of the invention will become apparent from the subject disclosure to those skilled in the art.

I claim:

1. In an apparatus for performing relative to an information carrier initially located in a casing a predetermined function outside of said casing, the improvement comprising in combination:

means for moving a length of said elongate information carrier relative to said casing and for forming said length of information carrier into a loop outside said casing for the performance of said function;

means for driving said moving means from an initial position to an advanced position for the formation of said loop, and from said advanced position back to said initial position;

means connected between said driving means and said moving means for transmitting driving power to said moving means;

means coupled to said transmitting means independently of said driving means for controlling said moving means, said controlling means including means for determining completion of a predetermined operation including completed formation of said loop by said moving means, and means for stopping and retaining said moving means in said advanced position upon determination of said completion; and means for performing said predetermined function relative to said information carrier outside of said casing.

2. An apparatus as claimed in claim 1, wherein: said stopping means include means for deenergizing said driving means upon determination of said completion.

3. An apparatus as claimed in claim 1, wherein: said stopping means include means for mechanically arresting said transmitting means.

4. An apparatus as claimed in claim 1, wherein: said transmitting means include a rotatable element; and said controlling means include means for counting revolutions of said rotatable element, and means for controlling said moving means in response to said counting of said revolutions.

5. An apparatus as claimed in claim 1, wherein:

said transmitting means include a shaft; and said controlling means include means for counting revolutions of said shaft and means for controlling said moving means in response to said counting of shaft revolutions.

6. An apparatus as claimed in claim 1, including: means coupled to said controlling means for controlling an aspect of the performance of said function.

7. An apparatus as claimed in claim 1, including: means coupled to said controlling means for controlling the tension of said elongate information carrier.

8. In an apparatus for performing relative to an information carrier initially located in a casing a predetermined function outside of said casing, the improvement comprising in combination:

means for moving a length of said elongate information carrier relative to said casing and for forming said length of information carrier into a loop outside said casing for the performance of said function;

means for driving said moving means from an initial position to an advanced position for the formation of said loop, and from said advanced position back to said initial position;

means connected between said driving means and said moving means for transmitting driving power to said moving means;

means coupled to said transmitting means independently to said driving means for controlling said moving means, said controlling means including means for determining completion of a predetermined operation including completed formation of said loop by said moving means, and means for stopping and retaining said moving means in said advanced position upon determination of said completion;

means for performing said predetermined function relative to said information carrier outside of said casing;

means for moving said casing to a predetermined position; and means coupled to said controlling means for controlling said casing moving means in response to operation of said controlling means.

9. In an apparatus for performing relative to an information carrier initially located in a casing a predetermined function outside of said casing, the improvement comprising in combination:

means for moving a length of said elongate information carrier relative to said casing and for forming said length of information carrier into a loop outside said casing for the performance of said function;

means for driving said moving means from an initial position to an advanced position for the formation of said loop, and from said advanced position back to said initial position;

means connected between said driving means and said moving means for transmitting driving power to said moving means;

means coupled to said transmitting means independently of said driving means for controlling said moving means, said controlling means including means for determining completion of a predetermined operation including completed formation of said loop by said moving means, and means for stopping and retaining said moving means in said advanced position upon determination of said completion;

means for performing said predetermined function relative to said information carrier outside of said casing;

means for moving said casing; and means coupled to said controlling means for controlling said means for moving said casing.

10. In an apparatus for performing relative to an elongate information carrier initially located in a casing a predetermined function outside of said casing, the improvement comprising in combination:

container means for said casing;

means coupled to said container means for moving said container means to a first position for selective insertion of said casing into and removal of said casing from said container means;

means for moving a length of said elongate information carrier out of said casing and for returning a length of said elongate information carrier into said casing;

means operatively associated with said moving means for locking said container means in a second position against manual removal preparatory to movement of said information carrier length out of said casing and until completion of said return of an information carrier length into said casing; and
means coupled to said moving means and said locking means for releasing said locking means upon a return of said information carrier into said casing.

11. In an apparatus for performing relative to an elongate information carrier initially located in a casing a predetermined function outside of said casing, the improvement comprising in combination:
means for moving a length of said information carrier out of said casing;
means for driving said moving means;
means connected between said driving means and said moving means for transmitting driving power to said moving means; and
means coupled to said transmitting means for locking said casing in position upon transmission of driving power to said moving means.

12. An apparatus as claimed in claim 11 wherein:
said moving means include means for returning a length of said elongate information carrier into said casing; and
said locking means include means coupled to said transmitting means for maintaining said casing locked in position until completion of said return of an information carrier length into said casing.

13. An apparatus as claimed in claim 12, including:
container means for said casing;
means coupled to said container mens for moving said container means to a first position for selective insertion of said casing into and removal of said casing from said container means; and
means coupled to said locking means for locking said container means in a second position upon transmission of driving power to said moving means and until completion of said return of an information carrier length into said casing.

14. An apparatus as claimed in claim 11, including:
means coupled to said transmitting means for controlling said moving means; and
means coupled to said controlling means and said locking means for controlling said locking means.

15. An apparatus as claimed in claim 14 including:
means coupled to said means for controlling said moving means for controlling tension of said elongate information carrier.

16. An apparatus as claimed in claim 11, wherein:
said transmitting means include a shaft; and
said apparatus includes means for counting revolutions of said shaft, and means for controlling said moving means and said locking means in response to said counting of shaft revolutions.

17. An apparatus as claimed in claim 16 including:
means coupled to said controlling means for controlling tension of said elongate information carrier in response to said counting of shaft revolutions.

18. In apparatus for performing relative to an information carrier initially located in a casing a predetermined function outside of said casing, the improvement comprising in combination:
means for moving a length of said elongate information carrier relative to said casing and for forming said length of information carrier into a loop outside said casing for the performance of said function,
rotatable means for driving said moving means from an initial position to an advanced position for the formation of said loop, and from said advanced position back to said initial position;
means coupled to said rotatable driving means for counting revolutions of said driving means;
means for controlling said moving means in response to said counting of said revolutions by said counting means; and
means for performing said predetermined function relative to said information carrier outside of said casing.

19. An apparatus as claimed in claim 18, wherein:
said controlling means include means for stopping and retaining said moving means in said advanced position in response to the counting of a predetermined number of said revolutions by said counting means.

20. An apparatus as claimed in claim 19, wherein:
said controlling means include means for stopping said moving means in said initial position in response to the counting of a predetermined number of said revolutions by said counting means 21. An apparatus as claimed in claim 19, wherein:
said controlling means include means for deenergizing said driving means.

22. In apparatus for performing relative to an information carrier initially located in a casing a predetermined function outside of said casing, the improvement comprising in combination:
tape drive means including a capstan spaced from said casing;
means for moving a length of said elongate information carrier relative to said casing and for forming said length of information carrier into a loop outside said casing for the performance of said function, said moving means including means for placing said loop into driving engagement with said capstan in an advanced position of said moving means;
means for driving said moving means from an initial position to an advanced position for the formation of said loop and placement of said loop into engagement with said capstan, and from said advanced position back to said initial position;
means for mechanically retaining said moving means in said advanced position;
means for deenergizing said driving means upon attainment of said advanced position by said moving means; and
means for performing said predetermined function relative to said information carrier outside of said casing.

23. An apparatus as claimed in claim 22, wherein:
at least one of said driving and moving means inacludes a rotatable element; and
said retaining means include means for mechanically retaining said moving means upon a predetermined rotational movement of said rotatable element.

24. An apparatus as claimed in claim 22, wherein:
said retaining means include means for retaining said moving means in said initial position.

25. An apparatus as claimed in claim 22, wherein:
at least one of said driving and moving means includes a rotatable element; and
said retaining means include means for mechanically retaining said moving means in said advanced position upon a predetermined rotational movement of said rotatable element in a first sense of rotation, and for mechanically retaining said moving means in said initial position upon a predetermined rotational movement of said rotatable element in a second sense of rotation.

26. An apparatus as claimed in claim 22, including:

means for tensioning said elongate information carrier; and means coupled to said moving means and to said tensioning means for controlling the tension of said length of elongate information carrier during said loop formation.

27. In apparatus for performing relative to an information carrier initially located in a casing a predetermined function outside of said casing, the improvement comprising in combination:

tape drive means including a capstan spaced from said casing;

means for moving a length of said elongate information carrier relative to said casing and for forming said length of information carrier into a loop outside said casing for the performance of said function, said moving means including means for placing said loop into driving engagement with said capstan in an advanced position of said moving means;

means for driving said moving means from an initial position to an advanced position for the formation of said loop and placement of said loop into engagement with said capstan, and from said advanced position back to said initial position, at least one of said driving and moving means including a rotatable element;

means for mechanically retaining said moving means in said advanced position;

means for deenergizing said driving means upon attainment of said advanced position by said moving means;

means for performing said predetermined function relative to said information carrier outside of said casing;

a lock lever mechanism; and means for actuating said retaining means and lock lever mechanism upon a predetermined rotational movement of said rotatable element.

28. An apparatus as claimed in claim 27, wherein:

said lock lever mechanaism is part of said retaining means.

29. An apparatus as claimed in claim 27, wherein:

said lock lever mechanism includes means for selectively retaining said casing in a predetermined position.

* * * * *